(12) United States Patent
Bansal et al.

(10) Patent No.: US 11,677,830 B2
(45) Date of Patent: Jun. 13, 2023

(54) SETTING DEVICE OPERATIONAL PARAMETERS USING MANUFACTURER USAGE DESCRIPTION FILES

(71) Applicant: Cisco Technology, Inc., San Jose, CA (US)

(72) Inventors: Priyanka Bansal, Bengaluru (IN); Jerome Henry, Pittsboro, NC (US); Neha Nigam, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 17/370,044

(22) Filed: Jul. 8, 2021

(65) Prior Publication Data

US 2023/0010856 A1 Jan. 12, 2023

(51) Int. Cl.
*H04L 67/12* (2022.01)
*G16Y 40/30* (2020.01)

(52) U.S. Cl.
CPC .............. *H04L 67/12* (2013.01); *G16Y 40/30* (2020.01)

(58) Field of Classification Search
CPC ..... H04L 67/12; H04L 41/08; H04L 41/0803; H04L 41/0806; H04L 41/0813; H04L 41/0823; H04L 41/084; H04L 41/085; H04L 41/0894; H04L 41/0895; G16Y 40/30
See application file for complete search history.

(56) References Cited

U.S. PATENT DOCUMENTS

| | | | | |
|---|---|---|---|---|
| 10,298,581 | B2* | 5/2019 | Shah | H04W 12/35 |
| 10,595,320 | B2* | 3/2020 | Lear | H04W 48/16 |
| 10,609,147 | B2* | 3/2020 | Henry | H04L 67/10 |
| 2008/0016189 | A1* | 1/2008 | Yoo | H04L 12/2814 |
| | | | | 709/220 |
| 2019/0110298 | A1* | 4/2019 | Lear | H04W 88/12 |
| 2019/0319953 | A1* | 10/2019 | Lear | H04L 63/20 |
| 2019/0364110 | A1* | 11/2019 | Henry | H04L 67/12 |

(Continued)

FOREIGN PATENT DOCUMENTS

| | | |
|---|---|---|
| WO | 2020118377 | 6/2020 |
| WO | 2020249245 | 12/2020 |

OTHER PUBLICATIONS

Garcia, S.N.M.; Molina Zarca, A.; Hernández-Ramos, J.L.; Bernabé, J.B.; Gómez, A.S. Enforcing Behavioral Profiles through Software-Defined Networks in the Industrial Internet of Things. Appl. Sci. 2019, 9, 4576. doi.org/10.3390/app9214576 (Year: 2019).*

(Continued)

*Primary Examiner* — David R Lazaro
(74) *Attorney, Agent, or Firm* — Behmke Innovation Group LLC; Kenneth J. Heywood; Jonathon P. Western

(57) ABSTRACT

In one embodiment, a controller in a network obtains information associated with one or more nodes connected to a particular node in the network. The controller sends a Manufacturer Usage Description request for the particular node that includes the information associated with the one or more nodes connected to the particular node. The controller receives, in response to sending the Manufacturer Usage Description request, operational parameter values for the particular node. The controller configures the particular node using the operational parameter values.

16 Claims, 6 Drawing Sheets

(56) References Cited

U.S. PATENT DOCUMENTS

2020/0136991 A1* 4/2020 Salgueiro ............... H04W 4/70
2020/0322356 A1 10/2020 Sheth et al.

OTHER PUBLICATIONS

E. Lear and B. Weis, "Slinging MUD: Manufacturer usage descriptions: How the network can protect things," 2016 International Conference on Selected Topics in Mobile & Wireless Networking (MoWNeT), 2016, pp. 1-6, doi: 10.1109/MoWNet.2016.7496625. (Year: 2016).*

Feraudo, et al., "SoK: Beyond IoT MUD Deployments—Challenges and Future Directions", online: https://arxiv.org/pdf/2004.08003.pdf, Apr. 22, 2020, 7 pages, arXiv.org.

Lear, et al., "Manufacturer Usage Description Specification", draft-ietf-opsawg-mud-20, Network Working Group, Apr. 9, 2018, 58 pages, IETF Trust.

* cited by examiner

SETTING DEVICE OPERATIONAL PARAMETERS USING MANUFACTURER USAGE DESCRIPTION FILES

TECHNICAL FIELD

The present disclosure relates generally to computer networks, and, more particularly, to setting device operational parameters using Manufacturer Usage Description (MUD) files.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

The growing complexity of systems that comprise IoT nodes that interact with one another can lead to situations in which one or more nodes affect the safe operating parameter of another node. Indeed, even if that node is configured to operate safely within a certain range of values, its interactions with other nodes can lead to situations in which that range is no longer considered safe (e.g., may lead to damage to the node or other nodes, may present a workplace hazard, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
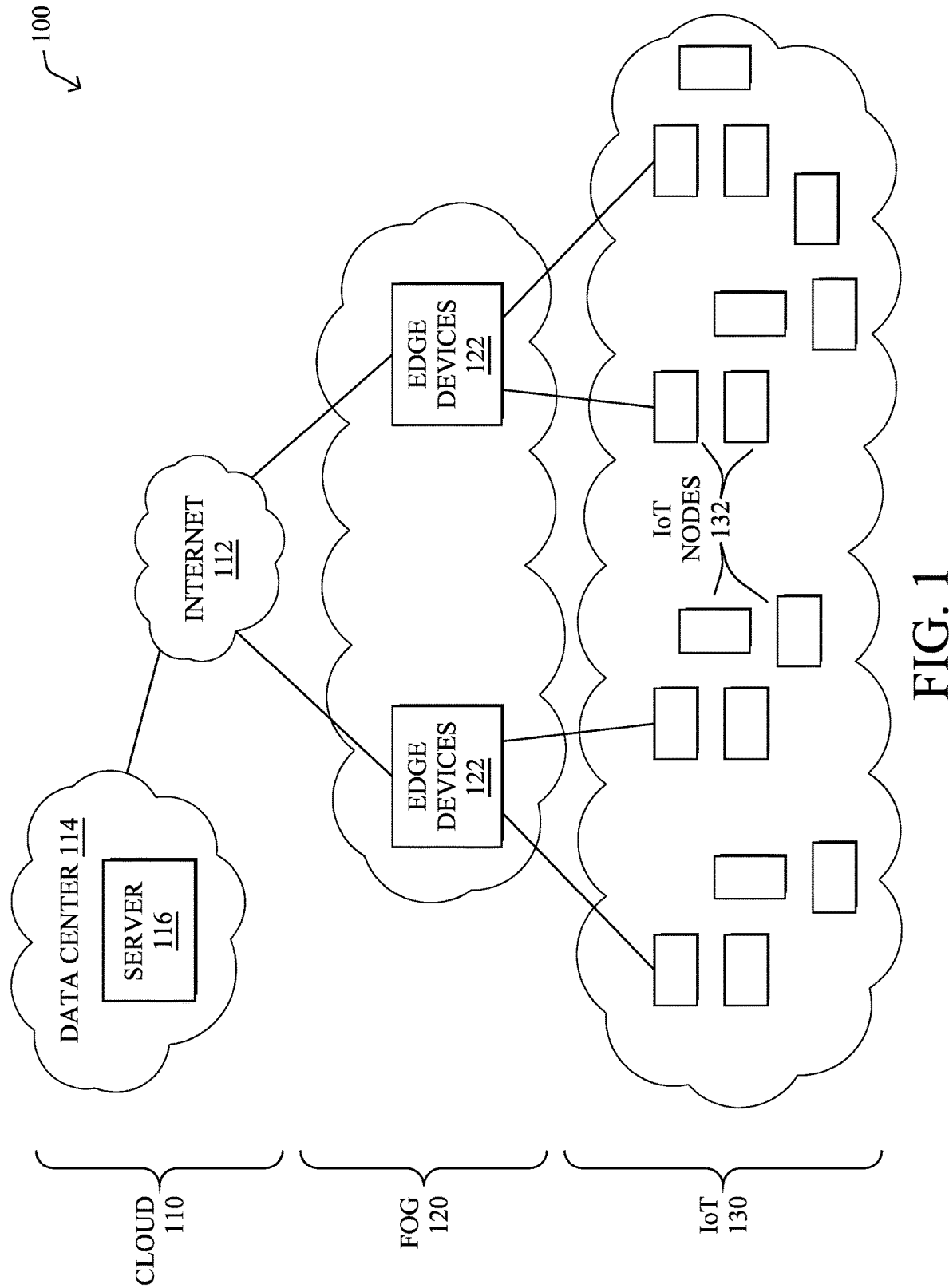
FIG. 1 illustrate an example network.

According to one or more embodiments of the disclosure, a controller in a network obtains information associated with one or more nodes connected to a particular node in the network. The controller sends a Manufacturer Usage Description request for the particular node that includes the information associated with the one or more nodes connected to the particular node. The controller receives, in response to sending the Manufacturer Usage Description request, operational parameter values for the particular node. The controller configures the particular node using the operational parameter values.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
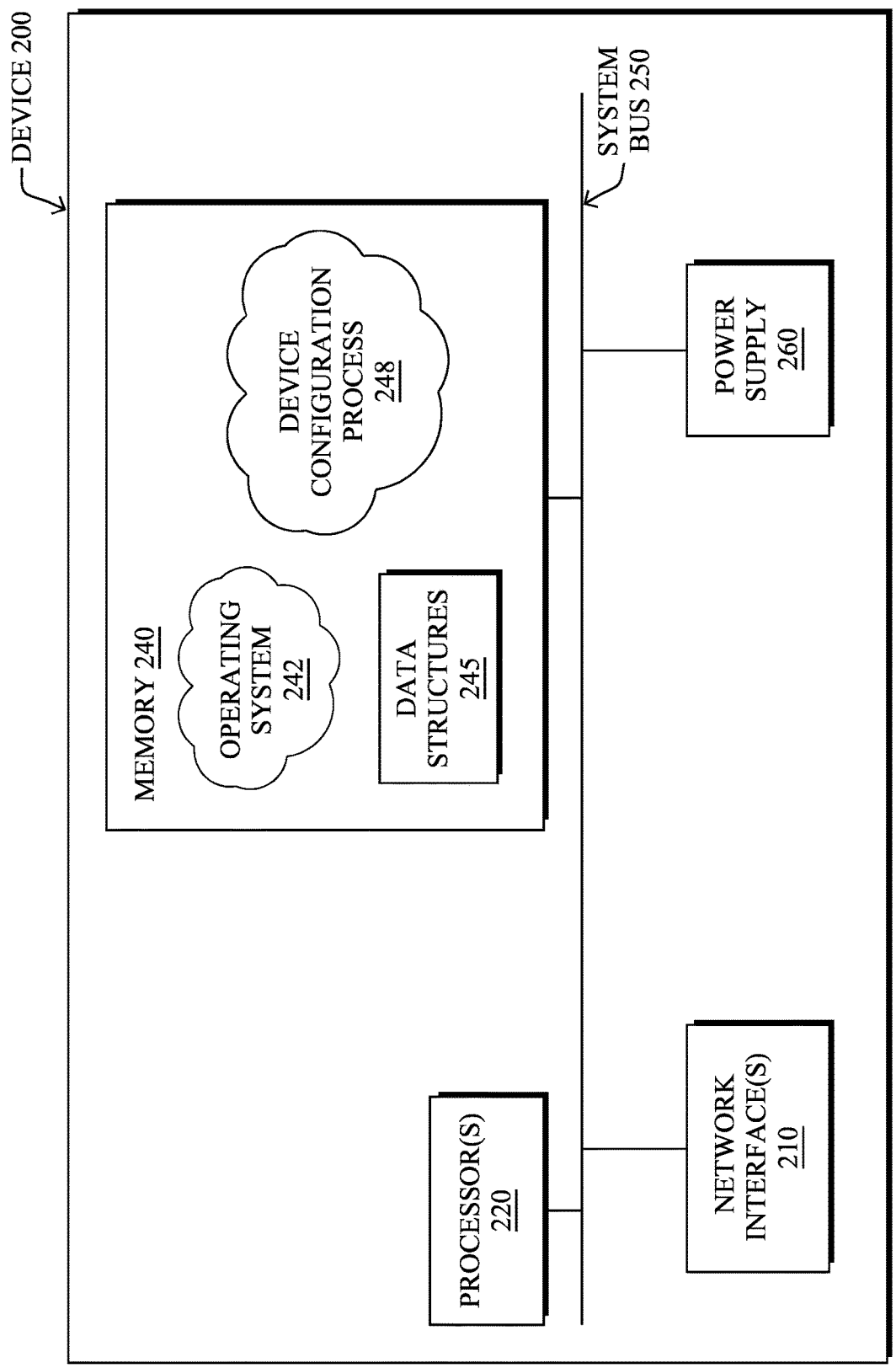
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative device configuration process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, device configuration process 248 may leverage the Manufacturer Usage Description (MUD) protocol, as detailed in the IETF draft entitled "Manufacturer Usage Description Specification" by E. Lear et al. In general, MUD allows access control information about a node to be included in a MUD file that is available from a MUD uniform resource indicator (URI), typically provided by the manufacturer of the node. More specifically, when a device is added to a network, it may report its pre-configured URI to a MUD service in the network, which retrieves the corresponding MUD file for the device from the URI. In turn, the MUD service may configure the access control policies for the device, based on the retrieved MUD file.

By way of example, assume that a smart lightbulb is added to a local network. In doing so, the smart lightbulb may send a MUD URI to a MUD service in the network. The MUD service may then retrieve a MUD file located at the URI that indicates the device type of the smart lightbulb and/or other identification information. Based on this, the MUD service may configure a network policy for the smart lightbulb that allows it to communicate with other smart lightbulbs in the network and an external application that controls its function, while also preventing the smart lightbulb from communicating with other devices or services.

Figure 3:
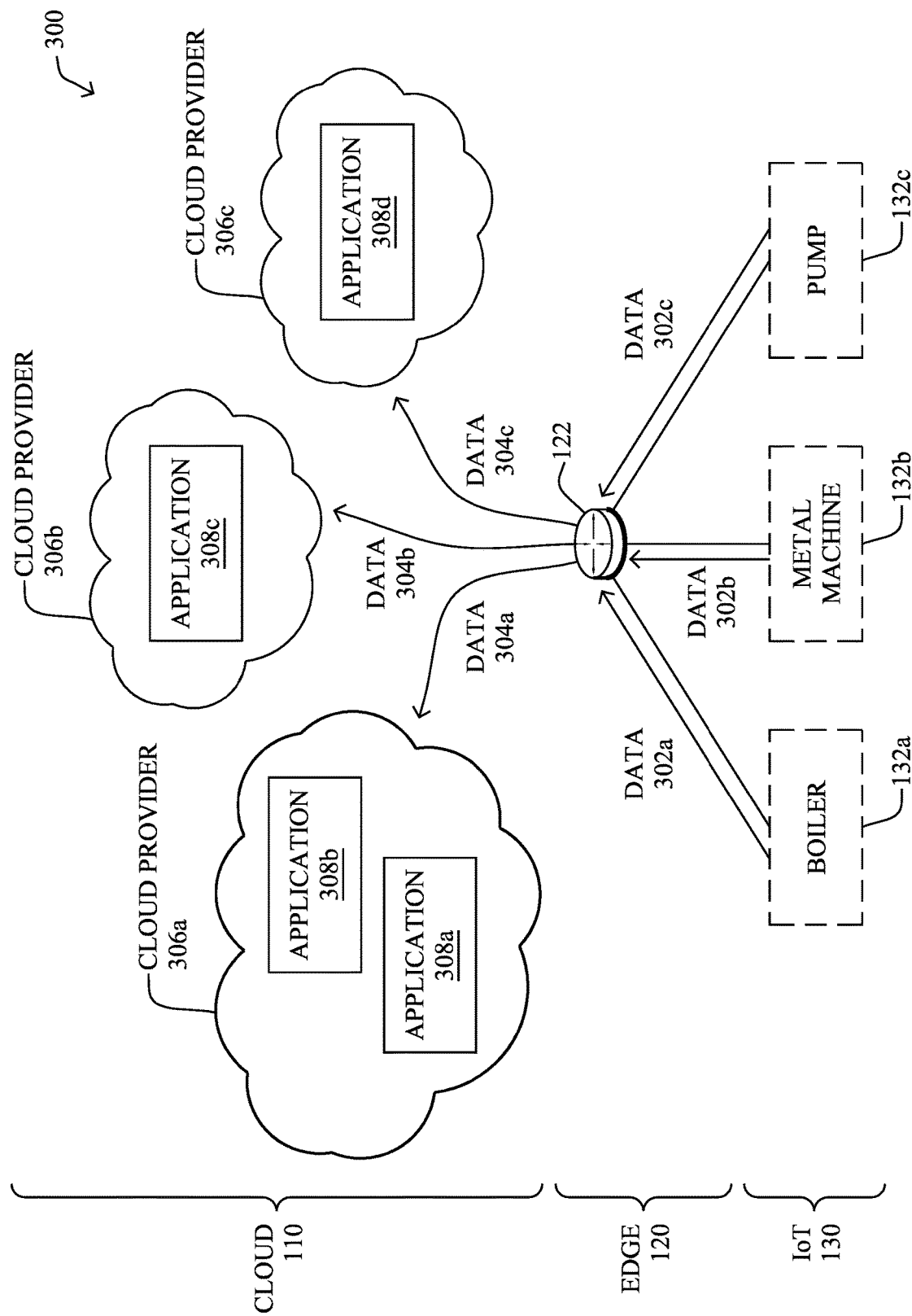
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As the IoT evolves, the variety of IoT devices will continue to grow, as well as the number of applications associated with the IoT devices. As a result, multiple cloud-based applications may take as input measurements or other data generated by a particular IoT device/node. For instance, as shown, assume that IoT nodes 132a-132c generate data 302a-302c, respectively, for consumption by any number of applications 308 hosted by different cloud providers 306, such as Microsoft Azure, Software AG, Quantela, MQTT/DC, or the like. In other instances, any of applications 308 may be configured to provide MUD files to edge device 122 that may be accessed at URIs specified by any of IoT nodes 132.

To complicate the collection and distribution of data 302a-302c, the different applications 308 may also require different sets of data 304a-304c from data 302a-302c. For instance, assume that cloud provider 306a hosts application 308a, which is a monitoring application used by the operator of the IoT network. In addition, cloud provider 306a may also host application 308b, which is a developer application that allows the operator of the IoT network to develop and deploy utilities and configurations for the IoT network. Another application, application 308c, may be hosted by an entirely different cloud provider 306b and be used by the vendor or manufacturer of a particular IoT node 132 for purposes. Finally, a further application, application 308d, may be hosted by a third cloud provider 306c, which is used by technicians for purposes of diagnostics and the like.

Through the access control mechanisms made possible through MUD, a particular IoT node 132 may be allowed or denied access to any other IoT node 132, cloud provider 306, and/or application 308. For example, if node 132c is a pump made by a particular manufacturer, it may be allowed to communicate externally only with the application 308 associated with its manufacturer.

As noted above, intrusion protection systems (IPS) and intrusion detection systems (IDS), collectively IPS/IDS, provide an efficient way to detect attacks occurring from outside of the network. However, in hybrid information technology (IT) and operations technology (OT) networks, IPS/IDS may not detect faults occurring from within the OT realm.

Within the OT space, behavioral analysis is an effective technique to detect anomalies in the traffic patterns and power profiles of OT devices. These profiles are either learned, which supposes that the system accepts that the observation of an existing set of machines defines the baseline (even if these machines are already compromised and operating outside of the vendor's expected ranges), or are based on existing templates. The latter case is particularly challenging with respect to IoT devices, as it requires the system to have a profile for most new devices, new versions of existing devices, devices with customized operating parameters, etc.

From a security perspective, one of the greatest threats in an OT network is an attack that seeks to cause physical harm to a device through manipulation of its operation. For instance, some malware may cause a device to operate outside of its safe operating range, causing the device to overheat and break down.

Indeed, machines in an industrial environment (e.g., a factory, a water treatment plant, a mine, an oil rig, etc.) often have very specific parameter ranges that are considered safe. This is especially true in the case of an industrial process implemented through the operation of multiple nodes/devices. For instance, consider the case of an assembly line in which different nodes work together to assemble and package a product. In such cases, the various nodes often form a large and complex system, where their interactions can constrain their expected operational ranges to specific subsets. Notably, unsafe combined ranges of operational parameters may be reached, even when an individual node is operating within its safe limits.

Setting Device Operational Parameters Using MUD Files

The techniques introduced herein allows an operator of complex IoT systems to exchange threshold and operational parameters with an expert, such as the vendor of a particular node, using the MUD framework. In some aspects, these parameters can be used as stop-gaps or operational boundaries, to determine what is 'normal' in the case of multiple nodes interacting with one another.

Illustratively, the techniques described herein may be performed by hardware, software, and/or firmware, such as in accordance with device configuration process 248, which may include computer executable instructions executed by the processor 220 (or independent processor of interfaces 210) to perform functions relating to the techniques described herein.

Specifically, in various embodiments, a controller in a network obtains information associated with one or more nodes connected to a particular node in the network. The controller sends a Manufacturer Usage Description request for the particular node that includes the information associated with the one or more nodes connected to the particular node. The controller receives, in response to sending the Manufacturer Usage Description request, operational parameter values for the particular node. The controller configures the particular node using the operational parameter values.

Figure 4A:
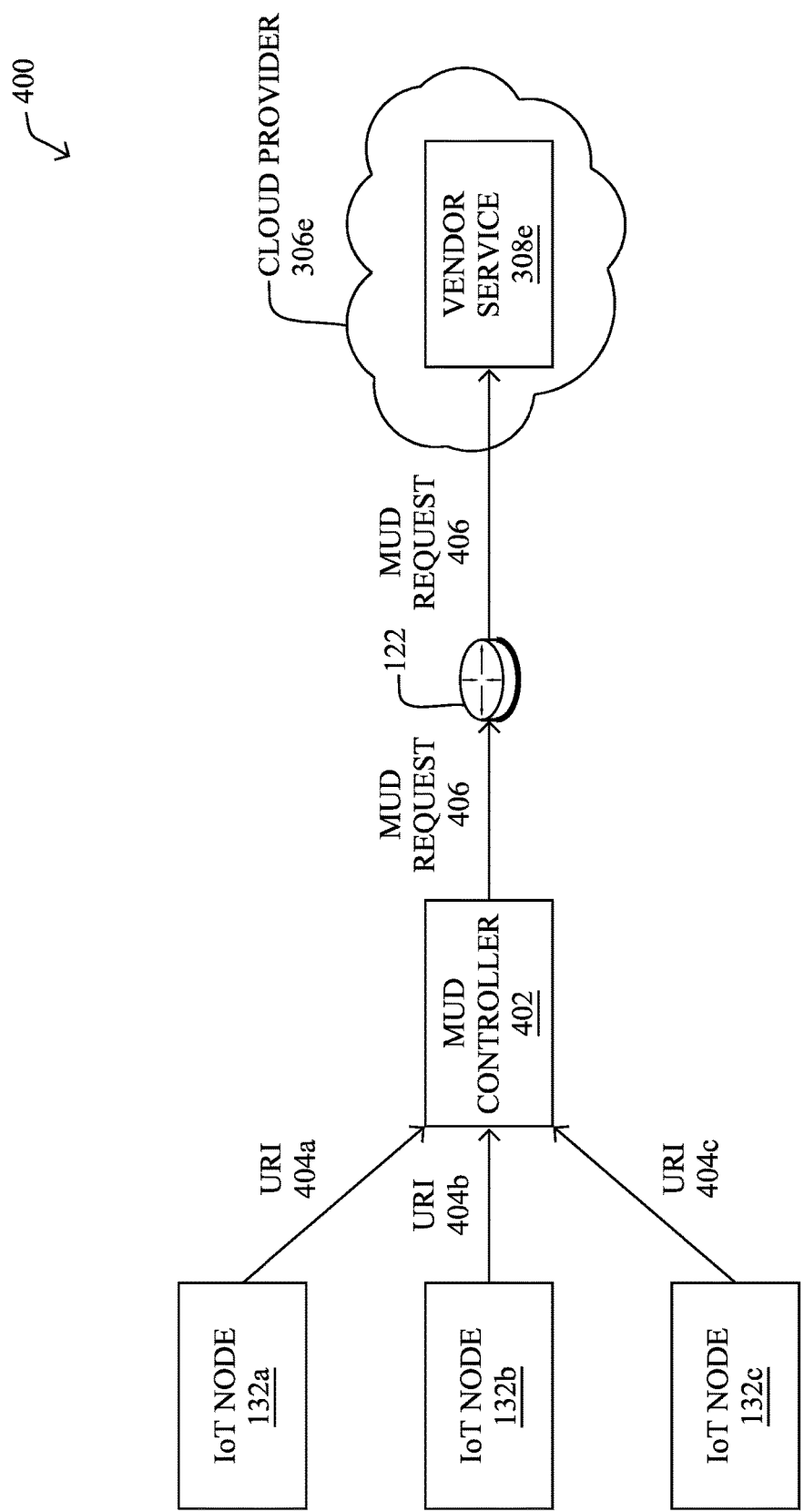
FIGS. 4A-4B illustrate examples of the automatic configuration of operational parameters for a node/device.
Figure 4B:
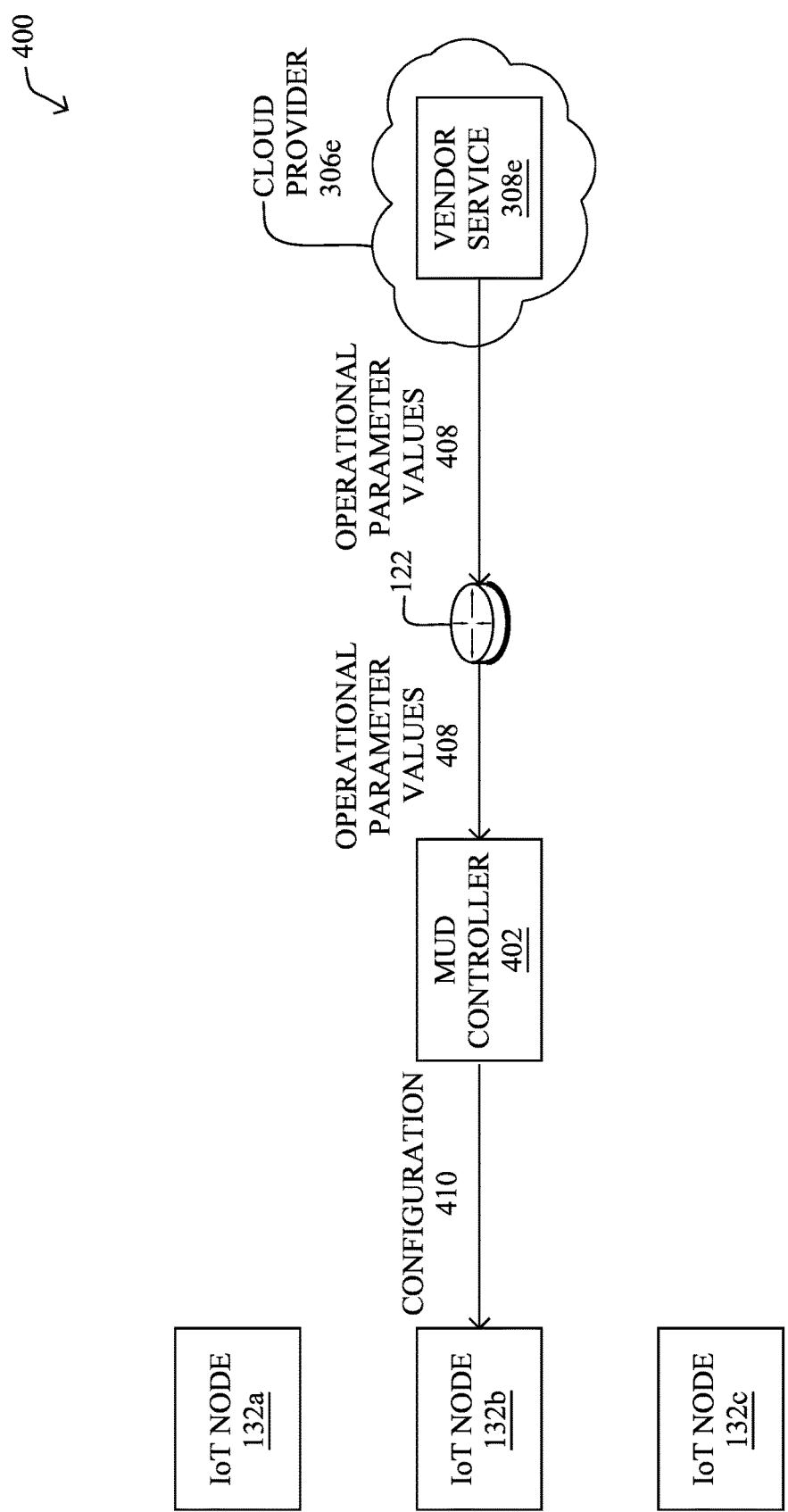

Operationally, FIGS. 4A-4B illustrate examples of the automatic configuration of operational parameters for a node/device, according to various embodiments. As shown in example architecture 400 in FIG. 4A, consider again the example of a system that includes various IoT nodes 132a-132c, an edge device 122, and any number of remote services hosted by any number of cloud providers, such as vendor service 308e hosted by cloud provider 306e. In addition to these components, further assume that there is a MUD controller 402 (e.g., a device 200) resident in the local network. Alternatively, MUD controller 402 may be hosted remotely or integrated into any of the devices shown.

For purposes of illustration, assume that IoT nodes 132a-132c are connected to one another, either via the network and/or physically, to implement an industrial process. Example industrial processes typically relate to the manufacture, production, or transformation of an item. Accordingly, IoT nodes 132a-132c may each perform a distinct step or function of the industrial process, based on their configured operational parameters. For instance, if IoT node 132b is a boiler, its operational parameters may relate to its set temperature, its water volume, etc. More generally, the operational parameters of a given IoT node are those parameters that affect how the node physically operates as part of the industrial process or system of which the node is a component.

As a first step, IoT nodes 132a-132c may each send their respective MUD URIs 404a-404c to MUD controller 402, in accordance with the MUD protocol. Each of these URIs may signify the location of a MUD file for its corresponding node, typically operated by the vendor of that node. Under the MUD protocol, these files often include information identifying their associated nodes/devices, for purposes of implementing a security policy in the network. For instance, a MUD file identifying IoT node 132a as being of a particular type can drive access control policies that specify which internal or external services with which IoT node 132a can communicate.

According to various embodiments, the MUD files for IoT nodes 132a-132c also be augmented to indicate the operational parameters and 'safe' values for their respective IoT nodes. Thus, MUD controller 402 may retrieve the MUD files for IoT nodes 132a-132c that also include their operational parameters and values. In further embodiments, MUD controller 402 may also obtain information regarding the configurations of IoT nodes 132a-132c directly from them and/or from a supervisory service in the local network.

At this point, MUD controller 402 now has information regarding any particular node (e.g., IoT node 132b) and the other node(s) with which it is connected (e.g., IoT node 132a and IoT node 132c). This information may take various forms, from simply the MUD URIs 404 for the nodes, to the MUD files retrieved by MUD controller 402 for the nodes, to information extracted by MUD controller 402 from these MUD files, and/or other information regarding the nodes.

According to various embodiments, MUD controller 402 may send a MUD request 406 to a vendor service 308e for IoT node 132b that includes the information for the other IoT nodes 132a, 132c that are connected to IoT node 132b. To do so, MUD controller 402 may send MUD request 406 to the location of URI 404b specified by IoT node 132b. Regardless of the specific form of the information for IoT nodes 132a-132c included in MUD request 406 (e.g., URIs 404a-404c, MUD files, etc.), MUD controller 402 will essentially send a mapping of the IoT nodes 132a-132c to vendor service 308e that indicates the IoT nodes that interact with one another. Note that while MUD request 406 is shown as a singular request, further embodiments provide for MUD request 406 to take the form of multiple uploads of information to 308e.

As shown in FIG. 4B, vendor service 308e may use the provided node information to determine the appropriate operational parameter values for IoT node 132b, based on its interactions with IoT nodes 132a, 132c. In cases in which vendor service 308e receives list of URIs, it may parse the combined URI list for keywords, matching part or all environmental components, and/or retrieve the corresponding MUD files from those URN. Regardless, the result is that vendor service 308e generates a specific MUD file that includes the operational parameter values 408 that are appropriate for IoT node 132b. This can be clone either based on a list of device/node profiles maintained by vendor service 308e or generated using the data specifications from the respective vendor(s) of IoT nodes 132a, 132c. In some cases, it may take vendor service 308e some time to retrieve all of the information that it needs to determine operational parameter values 408 for IoT node 132b. In such instances, vendor service 308e may either wait until it has the full set of information or respond to MUD controller 402 with an initial, incomplete MUD file for IoT node 132b that is later updated with a complete value set for operational parameter values 408.

For instance, assume that a particular operational parameter of IoT node 132b has a 'safe' range of $\{x1,y1\}$. However, because of its interactions with IoT node 132a, this range is limited to {x2,y2}. In such a case, operational parameter values 408 may instead specify the range of {x2,y2} for IoT node 132*b*.

Based operational parameter values 408 received from vendor service 308*e*, MUD controller 402 may configure IoT node 132*b*, accordingly. For instance, MUD controller 402 may send a configuration 410 directly to IoT node 132*b* that includes parameter values that are in accordance with operational parameter values 408. In other embodiments, MUD controller 402 may cause configuration 410 to be sent to IoT node 132*b* indirectly, such as via a supervisory service for IoT node 132*b*, by alerting an administrator as to operational parameter values 408, or the like. As would be appreciated, a similar approach can also be taken with respect to the configuration of IoT node 132*a* and/or node 132*c*.

A further aspect of the techniques herein is that the configuration of an IoT node, such as IoT node 132*b*, may be an ongoing process whereby the node is reconfigured over time. Indeed, in many complex systems, different components may be active at any given time. As such, each time a new node is activated, deactivated, or otherwise changed, MUD controller 402 may send updated node information to vendor service 308*e* reflecting the new interaction mapping, and possibly associated with new operational parameters, as well. In turn, vendor service 308*e* may return an "unchanged parameter set" message, or a new MUD file with updated operational values. This updating can also occur at specified intervals during which MUD controller 402 uploads a snapshot of operational parameters of importance. In one embodiment, this snapshot may take the form of an augmented MUD URI. This allows any given node to be identified by its URI, which may also identify key metrics for its operational parameters (e.g., https://foo.test/input1&pressure=641&viscosity=237, to return that this node measured a pressure of 641 psi and viscosity of 247 cP, and retrieve an operational parameter file (e.g., a MUD file) or a status response (e.g., indicating normal values, to raise an alert, etc.). In a further embodiment, reconfiguration can also be triggered manually, such as part of a maintenance routine.

It is envisioned that the system thus uploads to each node vendor a mapping of the connected nodes, in order to receive back the operational parameter values for their respective nodes/devices. When parameters are added, it may happen that the safe-values returned by a vendor may contradict values returned by a vendor of a connected components (e.g. wood paste viscosity 37, dryer vendor (crystallin) "with coater scp763425, operational speed 20 to 47, overhead 51 to 62", but coater vendor "with crystallin 5314297, operational speed 51 to 64").

The vendor service(s) examine the uploaded combined data, and output resulting guidance as to the parameter values. This output can be automatic, based on the steps above, and reflects the known parameters ranges acceptable by the vendor parts, when in combination with the parts and their reported levels that the updated augmented URIs described. As operational thresholds exceed the expected values (when in combinations with other complex parameters), automatic alerts can inform the operator of IoT nodes 132*a*-132*c* or other measures, such as a maintenance visits from the vendor. These elements can also be exchanged in MUD formats.

In some instances, the system complexity may be beyond automation capabilities. In that case, a first temporal range or a hold instruction can be returned by the vendor, while experts evaluate the combination and ranges before providing further recommendations. The same effect occurs when different vendors return contradicting values (e.g., values recommended for IoT node 132*a* are incompatible with values recommended for connected IoT node 132*b*).

The outcome of the above approach is that complex parameter combinations can be taken into account in scenarios where a simple machine profile is not available. Closed loop monitoring and alert also becomes possible when complex systems cannot stream full operational parameters to the individual vendors of their component nodes.

Figure 5:
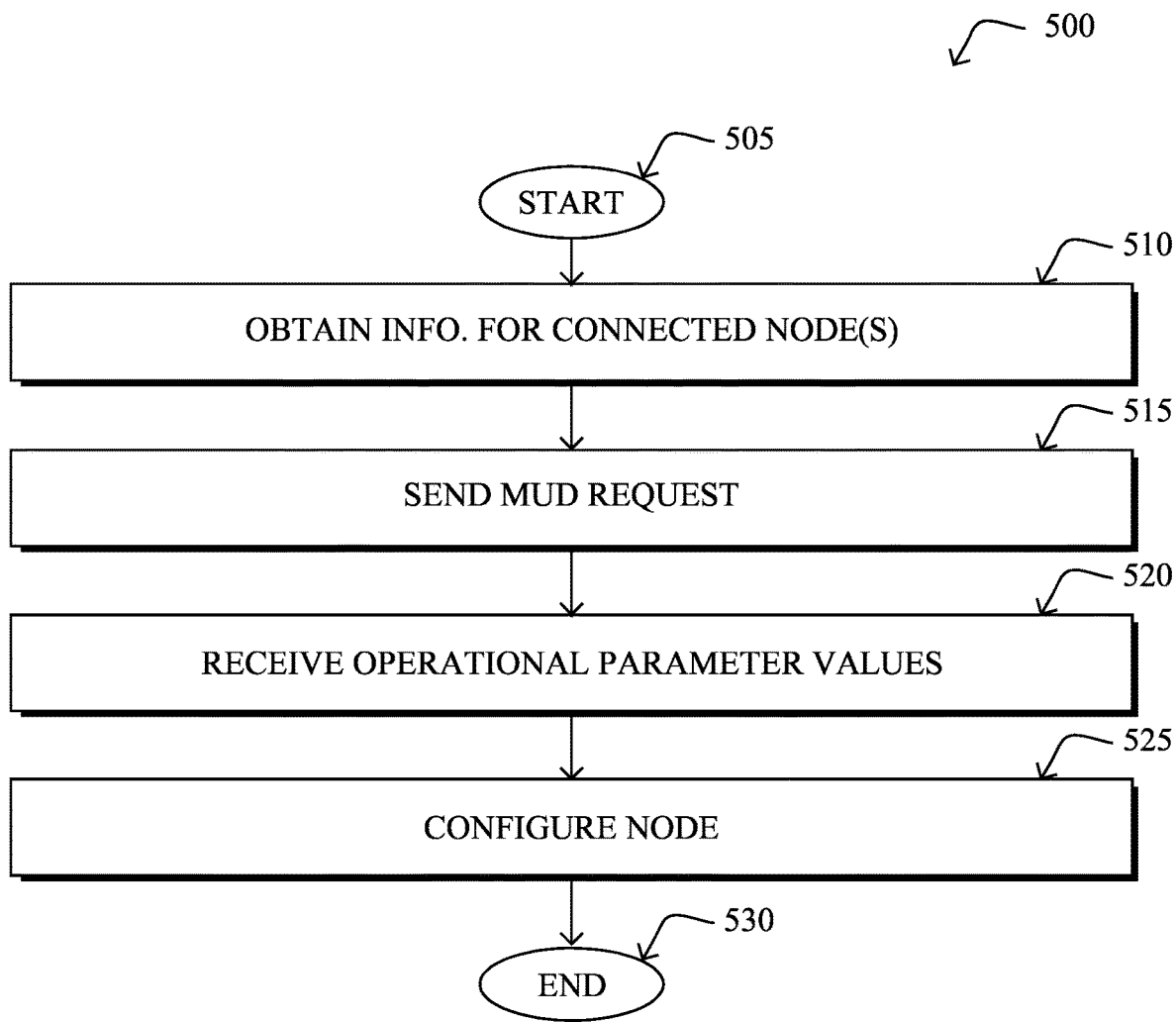
FIG. 5 illustrates an example simplified procedure for configuring a node in a network.

FIG. 5 illustrates an example simplified procedure for configuring a node in a network, in accordance with one or more embodiments described herein. The procedure 500 may start at step 505, and continues to step 510, where, as described in greater detail above, a specifically-configured device (e.g., device 200), such as a MUD controller in a network, may obtain information associated with one or more nodes connected to a particular node in the network. For instance, the particular node and the one or more other nodes may operate in conjunction with one another to perform an industrial process (e.g., manufacturing a product, performing a task, etc.). In one embodiment, the information may comprise MUD URIs for the one or more nodes connected to the particular node. In another embodiment, the controller may retrieve the information associated with the node(s) as MUD files, such as from their respective vendors (e.g., using the URIs supplied by them).

At step 515, as detailed above, the controller may send a MUD request for the particular node that includes the information associated with the one or more nodes connected to the particular node. For instance, the controller may send the MUD request to a vendor of the particular node using a URI supplied by the particular node to the controller. In general, the included information may be indicative of the operational values used by the node(s) connected to the particular node for which the MUD request is sent. This can be done in various ways such as by including the URI(s) for the connected node(s) in the MUD request, including the MUD file(s) for the connected node(s) in the MUD request, including parameter values extracted from those MUD file(s) or obtained from the node(s), combinations thereof, or the like.

At step 520, the controller may receive, in response to sending the MUD request for the particular node, operational parameter values for the particular node, as described in greater detail above. For instance, the vendor of the particular node may populate or generate a MUD file for the particular node that specifies the operational parameters for the particular node (e.g., a parameter range, thresholds, etc.), given the other node(s) with which the particular node is connected.

At step 525, as detailed above, the controller may configure the particular node using the operational parameter values. For instance, the controller may send the operational parameter values to the particular node, directly, or may do so indirectly, such as by sending the values to another device or user that effects the configuration change. In various embodiments, the controller may also repeat any or all of the above steps (e.g., periodically, on demand, in response to a change, etc.), to reconfigure the particular node with updated values, as needed. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the automatic configuration and reconfiguration of the operational parameter values of an IoT node, while taking into account the other node(s) with which it interacts. In doing so, situations can be avoided whereby the parameter values of the node are within its safe range, but are not considered safe within the greater context of the system/industrial process that includes the particular node.

While there have been shown and described illustrative embodiments for setting device operational parameters using MUD, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network (e.g., by the edge device), a remote location (e.g., in the cloud), etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   obtaining, by a controller in a network, information associated with one or more nodes connected to a particular node in the network, wherein the information associated with the one or more nodes connected to the particular node comprises Manufacturer Usage Description uniform resource identifiers (URIs) or one or more Manufacturer Usage Description files;
   sending, by the controller, a Manufacturer Usage Description request for the particular node that includes the information associated with the one or more nodes connected to the particular node;
   receiving, at the controller and in response to sending the Manufacturer Usage Description request, operational parameter values for the particular node; and
   configuring, by the controller, the particular node using the operational parameter values.

2. The method as in claim 1, wherein the operational parameter values for the particular node are received via a Manufacturer Usage Description file.

3. The method as in claim 1, further comprising:
   sending, by the controller, an updated Manufacturer Usage Description request for the particular node, based on a change to the one or more nodes connected to the particular node, to obtain updated operational parameter values for the particular node; and
   reconfiguring, by the controller, the particular node using the updated operational parameter values.

4. The method as in claim 1, wherein the information associated with one or more nodes connected to a particular node in the network is indicative of operational parameter values used by the one or more nodes.

5. The method as in claim 1, wherein the controller sends the Manufacturer Usage Description request for the particular node to a uniform resource indicator (URI) specified by the particular node.

6. The method as in claim 1, wherein the controller sends the Manufacturer Usage Description request for the particular node to a vendor of the particular node.

7. The method as in claim 1, wherein the operational parameter values specify a parameter range for the particular node.

8. The method as in claim 1, wherein the particular node and the one or more nodes connected to the particular node perform an industrial process in conjunction with one another.

9. An apparatus, comprising:
   one or more network interfaces;
   a processor coupled to the one or more network interfaces and configured to execute one or more processes; and
   a memory configured to store a process that is executable by the processor, the process when executed configured to:
      obtain information associated with one or more nodes connected to a particular node in a network, wherein the information associated with the one or more nodes connected to the particular node comprises Manufacturer Usage Description uniform resource identifiers (URIs) or one or more Manufacturer Usage Description files;
      send a Manufacturer Usage Description request for the particular node that includes the information associated with the one or more nodes connected to the particular node;
      receive, in response to sending the Manufacturer Usage Description request, operational parameter values for the particular node; and
      configure the particular node using the operational parameter values.

10. The apparatus as in claim 9, wherein the operational parameter values for the particular node are received via a Manufacturer Usage Description file.

11. The apparatus as in claim 9, wherein the process when executed is further configured to:
    send an updated Manufacturer Usage Description request for the particular node, based on a change to the one or more nodes connected to the particular node, to obtain updated operational parameter values for the particular node; and
    reconfigure the particular node using the updated operational parameter values.

12. The apparatus as in claim 9, wherein the information associated with one or more nodes connected to a particular node in the network is indicative of operational parameter values used by the one or more nodes.

13. The apparatus as in claim 9, wherein the apparatus sends the Manufacturer Usage Description request for the particular node to a uniform resource indicator (URI) specified by the particular node.

14. The apparatus as in claim 9, wherein the apparatus sends the Manufacturer Usage Description request for the particular node to a vendor of the particular node.

15. The apparatus as in claim 9, wherein the particular node and the one or more nodes connected to the particular node perform an industrial process in conjunction with one another.

16. A tangible, non-transitory, computer-readable medium storing program instructions that cause a controller in a network to execute a process comprising:
- obtaining, by the controller in the network, information associated with one or more nodes connected to a particular node in the network, wherein the information associated with the one or more nodes connected to the particular node comprises Manufacturer Usage Description uniform resource identifiers (URIs) or one or more Manufacturer Usage Description files;
- sending, by the controller, a Manufacturer Usage Description request for the particular node that includes the information associated with the one or more nodes connected to the particular node;
- receiving, at the controller and in response to sending the Manufacturer Usage Description request, operational parameter values for the particular node; and
- configuring, by the controller, the particular node using the operational parameter values.

\* \* \* \* \*

UNITED STATES PATENT AND TRADEMARK OFFICE
CERTIFICATE OF CORRECTION

| | |
|---|---|
| PATENT NO. | : 11,677,830 B2 |
| APPLICATION NO. | : 17/370044 |
| DATED | : June 13, 2023 |
| INVENTOR(S) | : Priyanka Bansal et al. |

It is certified that error appears in the above-identified patent and that said Letters Patent is hereby corrected as shown below:

In the Specification

Column 8, Line 50, please amend as shown:
ing MUD files from those URIs. Regardless, the result is that Column 8, Line 53, please amend as shown:
appropriate for IoT node 132b. This can be done either Signed and Sealed this
Nineteenth Day of September, 2023

Katherine Kelly Vidal
*Director of the United States Patent and Trademark Office*